United States Patent Office 3,510,373
Patented May 5, 1970

3,510,373
METHOD OF MANUFACTURING A HEAT-RESIST-
ANT HIGH VOLTAGE INSULATION FOR ELEC-
TRICAL MACHINES
Werner Moller, Dubendorf, Switzerland, assignor to
Oerlikon Engineering Company, a Swiss corporation
No Drawing. Filed June 19, 1967, Ser. No. 647,198
Claims priority, application Switzerland, June 28, 1966,
9,362/66
Int. Cl. H01b 13/08
U.S. Cl. 156—53                                      8 Claims

ABSTRACT OF THE DISCLOSURE

A binder-free tape is impregnated with a solvent and an unsaturated polyester resin containing an accelerator. Tape may be stored for six to twelve months. After tape is wrapped around an electrical conductor, it is wetted with a styrene solution containing 0.5 to 10% of a peroxide, and then hardened at room temperature.

Tape may be glass fiber tape containing mica, or polyester woven tape. Accelerator may be a cobalt complex, such as cobalt octoate, or it may be an amine bonded to the polyester resin. While wetting tape, it may be surrounded by a semipermeable sheet to prevent the polyester resin and the cobalt complex accelerator from dissolving out of wrapping. Semipermeable sheet may be fiber reinforced thermoplastic sheet which swells in styrene.

---

The present invention relates to a method of manufacturing a heat-resistant, high voltage insulation for electrical machines by means of a pre-impregnated insulating tape.

It is known to bond mica to an insulating tape by means of an epoxy resin which is liquid when used and serves as a binder and filler. The tape is preferably of paper or fabric and serves as a mechanical support. The insulating material thus obtained is wrapped on a conductor before the commencement of the gelation of the epoxy resin, and then hardened in an apparatus which imparts a final shape to the insulation.

It is furthermore known to use a solvent-free synthetic resin in liquid form in the manufacture of an insulating tape. Such a tape consists of mica in sheet or flake form, a support material, and a synthetic resin serving simultaneously as a binder and an impregnating agent. The tape is pressed and hardened after the wrapping step, and then impregnated under vacuum with the resin.

The known methods involve the disadvantage that the impregnated insulating tape must be wrapped while wet around the conductor, or must be stored in an airtight container in order to prevent its drying out. Furthermore, the use of a low cost polyester resin as an impregnating resin is impossible, or impairs the heat resistance of the final insulation, or makes possible its cold-setting.

The object of the present invention is to avoid these disadvantages. A method in accordance with this invention is characterized by the fact that a binder-free tape is impregnated with a solvent and an unsaturated polyester resin containing an accelerator. The tape is then dried and may be stored. After wrapping the conductor with the impregnated tape, the wrapping is wetted with a styrene solution containing 0.5 to 10% of a peroxide, and hardened at room temperature.

In accordance with the invention, the accelerator contained in the polyester resin, used for the impregnating of the binder-free tape can, for instance, be a cobalt complex, such as cobalt octoate, added to the polyester resin. The cobalt complex acts, on the one hand, as a stabilizer for the resin and lengthens its shelf life. On the other hand, it accelerates the hardening of the polyester resin after the addition of a hardener. After the evaporation of the styrene, which is contained as a solvent in the polyester resin, the impregnated tape is dry and cannot cause any eczema. The storage life of the impregnated tape is as great as that of the resin, namely, about 6 to 12 months.

After wrapping a conductor with the impregnated tape, the wrapping can be wetted by immersion in, or spraying with, the peroxide-styrene solution. The hardening then takes place at room temperature within a few hours. The hardened insulation is compact and heat-resistant.

Examples of binder-free tapes which can be used are glass-fiber tapes containing mica, and polyester woven tapes. By impregnating a polyester woven tape with the polyester resin, a homogeneous polyester insulation is obtained which, due to the uniformity of quality of these two materials, is particularly well suited for use as a cover layer for finished conductor insulations having a base of epoxy resin or polyester resin. This increases the resistance of the insulation to water.

In order to prevent the polyester resin and the cobalt complex accelerator from being dissolved out of the wrapping when the wrapping is wetted with the peroxide-styrene solution, it is advantageous before the wetting step to surround the wrapping with a semi-permeable sheet which is permeable only with respect to the low molecular styrene and peroxide but not with respect to the polyester resin. Suitable materials for this purpose are, for instance, special papers, polyester weave, polyester felt, and in particular fiber-reinforced thermoplastic sheets which swell in styrene.

Another accelerator in accordance with the invention can be contained in the polyester resin itself, and can be an amine, for instance, a tertiary amine, bonded to the polyester resin. This accelerator acts in the same way as the cobalt complex accelerator described above. It has the further advantage, however, that it cannot be dissolved out of the wrapping when the wrapping is wetted with the peroxide-styrene solution. It is not necessary, therefore, to surround the wrapping with a semipermeable sheet.

The method will be further explained below in connection with some examples.

EXAMPLE 1

A glass-fiber/mica-paper tape, having no binder, is pre-dried at about 120° C., and thereafter impregnated at room temperature, and a pressure of about 10 mm. Hg, with an unsaturated polyester resin identified by the trademark "polylite 8080 B," which contains 30% styrene as a solvent and cobalt octoate as an accelerator. Thereupon, the styrene contained in the resin is evaporated for several hours at room temperature and a pressure of about 15 mm. Hg. The tape is thereupon dried in air at room temperature. The shelf life of the impregnated dry tape corresponds to that of the resin and is about 6 to 12 months.

The impregnated tape is wrapped around a conductor for instance, a slot bar. Thereupon, at room temperature and atmospheric pressure, the wrapping is dipped in or sprayed with a styrene solution which contains 5% methylethylketone peroxide or cyclohexanone peroxide. The wetted wrapping is then wrapped in a sheet of polytetrafluorethylene or polyester, pressed to its final shape, and hardened at room temperature for 24 hours.

EXAMPLE 2

A glass-fiber tape provided with mica which has been impregnated in accordance with Example 1 is wound around a conductor. Thereupon, the wrapping is surrounded by a semi-permeable sheet, for instance a polyester weave, a polyester felt, or a phenol-resin fabric. The wrapping is now dipped in or sprayed, at room temperature and atmospheric pressure, with a styrene solution which contains 5% methylethyl ketone peroxide or cyclohexanone peroxide. The wetted wrapping is thereupon wrapped in a sheet of polytetrafluorethylene or polyester, pressed to its final shape, and hardened at room temperature for 24 hours.

EXAMPLE 3

A polyester woven tape is impregnated in accordance with Example 1. The impregnated tape is wound around a conductor which is wrapped with an insulating tape and impregnated with a hardened synthetic resin, for instance an epoxy or polyester resin. Thereupon, at room temperature and atmospheric pressure, the wrapping is dipped in or sprayed with a styrene solution which contains 5% methylethyl ketone peroxide or cyclohexanone peroxide and hardened for 24 hours at room temperature. This polyester woven tape impregnated with the polyester resin constitutes excellent protection against water for the previously completely insulated conductor.

In order to prevent the polyester resin and accelerator from dissolving out when the wrapped impregnated polyester woven tape is wet by the styrene-peroxide solution, the wrapping can be surrounded before the wetting step with a semi-permeable sheet, e.g., a polyester weave or a polyester felt.

EXAMPLE 4

A glass-fiber/mica-paper tape, having no binder, is predried at about 120° C., and thereafter impregnated at room temperature and a pressure of about 10 mm. Hg, with an unsaturated polyester resin identified by the trademadk "Leguval K 41" which contains 30% styrene as a solvent and to which an amine is bonded as an accelerator. Thereupon, the styrene contained in the resin is evaporated for several hours at room temperature and a pressure of about 15 mm. Hg. The tape is thereupon dried in air at room temperature. The shelf life of the impregnated dry tape corresponds to that of the resin and is about 6 to 12 months.

The impregnated tape is wrapped around a conductor, for instance, a slot bar. Thereupon, at room temperature and atmospheric pressure, the wrapping is dipped in or sprayed with a styrene solution which contains 5% dibenzoyl peroxide. The wetted wrapping is then wrapped in a sheet of polytetrafluorethylene or polyester, pressed to its final shape, and hardened at room temperature for 24 hours.

What is claimed is:

1. A method of manufacturing a heat-resistant, high-voltage insulation for electrical machines comprising the steps of impregnating a binder-free tape with a solvent and an unsaturated polyester resin containing an accelerator, drying said tape, wrapping a conductor with the impregnated tape, wetting the wrapping with a styrene solution containing 0.5 to 10% of a peroxide, and hardening the wrapper at room temperature.

2. A method according to claim 1, wherein the accelerator is a cobalt complex added to the polyester resin.

3. A method according to claim 1, wherein the accelerator is an amine bonded to the polyester resin.

4. A method according to claim 1, wherein the binder-free tape used is a glass-fiber tape provided with mica.

5. A method according to claim 1, wherein the binder-free tape used is a polyester woven tape.

6. A method according to claim 1, wherein the wrapping is wetted with the styrene solution by dipping or spraying.

7. A method according to claim 1, wherein after the wrapping is wet with the styrene solution, the wrapping is surrounded by an impermeable sheet, pressed, and hardened at room temperature.

8. A method according to claim 1, wherein before the wrapping is wet with the styrene solution, the wrapping is surrounded by a semi-permeable sheet selected from the group consisting of a polyester weave, a polyester felt, or a fiber-reinforced thermoplastic sheet which is swellable in styrene.

References Cited

UNITED STATES PATENTS

| | | | |
|---|---|---|---|
| 3,369,947 | 2/1968 | Mertens et al. | 156—56 X |
| 3,393,268 | 7/1968 | Meyer et al. | 156—56 X |
| 3,427,189 | 2/1969 | Brechna | 156—53 X |

VERLIN R. PENDEGRASS, Primary Examiner

U.S. Cl. X.R.

156—56